Sept. 23, 1930.   W. VAN E. THOMPSON   1,776,456
STRAINER AND CONTROL VALVE
Filed Nov. 30, 1927
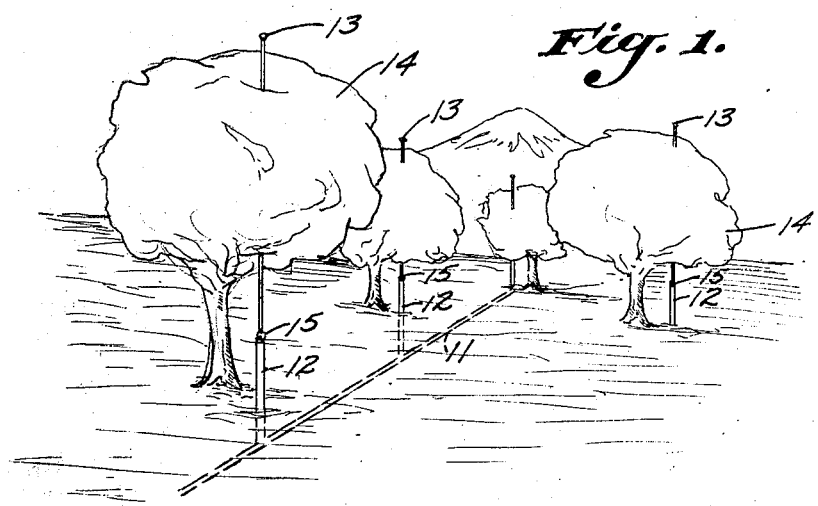
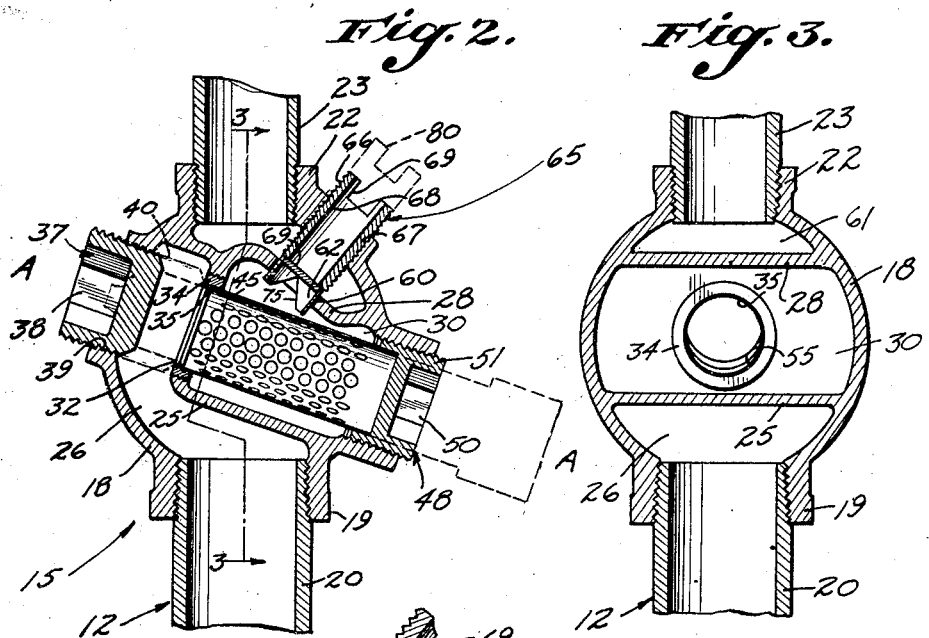
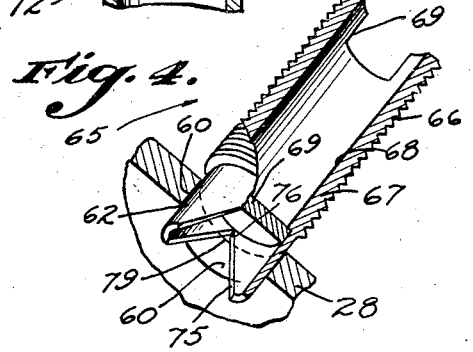
INVENTOR:
Walter Van E. Thompson,
BY
ATTORNEY.

Patented Sept. 23, 1930

1,776,456

UNITED STATES PATENT OFFICE

WALTER VAN E. THOMPSON, OF LOS ANGELES, CALIFORNIA, ASSIGNOR TO THOMPSON MANUFACTURING COMPANY, OF LOS ANGELES, CALIFORNIA, A CORPORATION OF CALIFORNIA

STRAINER AND CONTROL VALVE

Application filed November 30, 1927. Serial No. 236,747.

My invention relates to irrigation systems, and more particularly to a novel strainer-valve for use with a sprinkler irrigation system, this application being a continuation in part of my application, Serial No. 188,428, filed May 3, 1927, for regulatable strainer valve.

Irrigation systems, such as are used for irrigating orchards or other large areas, usually have a series of underground headers, from which vertical pipes extend. When these systems are used in orchards, the vertical pipes extend upward and have a nozzle at the extreme upper end thereof, these nozzles being situated in a plane above the tops of the trees of the orchard. In view of the fact that the water carries foreign particles, such as gravel or small snail shells, the nozzles frequently become clogged and it is necessary to remove them from the upper ends of the vertical pipes in order that they may be cleaned. This ordinarily is a costly and tedious job.

It is one of the objects of this invention to provide a novel strainer which may be placed in the vertical pipes near the surface of the ground so that foreign matter may be accumulated therein and prevented from passing into the nozzles.

The water-pressure at the different vertical pipes is not constant, but changes with the number of sprinklers supplied from a single header, the relative positions of the sprinklers with respect to the header, and the friction head in the underground piping. So also the pressure at the different vertical pipes may change, due to a change in pressure of the water supply. In order to have the sprinklers at different parts of the area throw water over a proper area, it is necessary to compensate for these differences in pressure applied to different nozzles. This I accomplish by a suitable control valve which accurately controls the amount of water delivered to each nozzle. This control valve may be conveniently placed adjacent to the strainer and by suitable adjustment it is possible to correctly balance a large number of sprinklers irrigating a given area.

It is an object of my invention to provide an apparatus adapted to be included in each sprinkler pipe of an irrigation system whereby the amount of fluid passing therethrough may be regulated.

In cleaning a strainer of one particular vertical pipe, it is necessary to shut off the fluid flow through this particular pipe. This may be accomplished by means of the control valve, but in so doing this particular sprinkler is thrown out of adjustment, and often the entire irrigation system is thrown out of balance so that extensive readjustments must be made.

It is an object of my invention to provide a strainer valve of the character heretofore mentioned in which fluid may be shut off without disturbing the adjustment of the control valve.

A further object of my invention is to provide a novel type of valve for controlling the flow of fluid therethrough.

Further objects and advantages of my invention will be made evident hereinafter.

Referring to the drawings:

Fig. 1 is a utility view showing an orchard equipped with overhead sprinklers embodying my invention.

Fig. 2 is a vertical sectional view of the strainer valve of my invention.

Fig. 3 is a vertical sectional view taken on the line 3—3 of Fig. 2.

Fig. 4 is a perspective view illustrating my novel type of control valve.

Referring to Fig. 1, the numeral 11 represents an underground header to which vertical sprinkler pipes 12 are connected, the upper ends of these sprinkler pipes being provided with sprinkler heads 13, which may be of either the stationary or the revolving type. These sprinkler heads 13 are adapted to irrigate trees 14 of an orchard. Provided in each of the vertical sprinkler pipes 12 at a distance of four or five feet above the surface of the ground, is a strainer valve 15 embodying the features of this invention.

The strainer-valve 15 is most clearly shown at Figs. 2 to 4 and comprises a body 18 which is nearly spherical in shape. Extended from the lower portion of the body 18 is a projection 19 which threadedly receives a lower pipe 20 of the vertical sprinkler pipe 12. The upper portion of the body 18 is provided with a projection 22 which threadedly receives and supports an upper pipe 23 of the vertical sprinkler pipe 12. It will be noted that the lower pipe 20 is larger in diameter than the upper pipe 23. This is desirable inasmuch as the lower pipe 20 is the intake pipe, and the pipe 23 is the outlet pipe, and by making them of different diameter it is possible to always supply an ample amount of fluid to the interior of the body 18.

A separating wall 25 extends across the interior of the body 18, forming a primary chamber 26 in communication with the interior of the lower pipe 20. Attached to the separating wall 25 and also to the body 18 is an inclined wall 28. This inclined wall 28, together with the separating wall 25, defines a secondary chamber 30. The primary and secondary chambers are in communication through an opening 32 in the wall 25, this opening being on an axis A—A of the strainer-valve 15 as best illustrated in Fig. 2. Screwed into the opening 32 is a double seat-member 34 having an opening 35 therein. Adapted to close the opening 35 is a shut-off valve 37 of my invention. This shut-off valve comprises a valve member 38 which is threadedly received in an opening 39 in the body 18. The valve 38 may be turned by a suitable socket wrench and may thus be moved from its full line position shown in Fig. 2, into its dotted line position indicated by the numeral 40. When in the dotted line position, no fluid may pass from the primary chamber into the secondary chamber.

Fitting into a seat 45 of the double seat-member 34, and extending through the secondary chamber 30, is a strainer 47, which forms a part of a strainer unit 48 of my invention. A strainer cap 50 is adapted to be threadedly received in an opening 51 of the body 18, and to bear against one end of the strainer 47, thus clamping the strainer between the seat member 34 and the strainer cap 50. It should be noted that the strainer 47 is concentric with the axis A—A and that the interior thereof communicates with the primary chamber 26 through the opening 35. Interstices 53 are formed through the strainer 47, thus allowing fluid to pass from the interior of the strainer into the secondary chamber 30. The interstices 53 are small in size and are adapted to prevent the passage of any gravel or other foreign matter into the fluid, this foreign matter accumulating in an accumulation chamber 55 in the lowermost portion of the strainer 47. By unscrewing the strainer cap 50, the strainer 47 may be readily removed and the foreign matter may be removed from the accumulation chamber 55.

Formed in the inclined wall 28 is an opening 60 which is circular in cross section, and which communicates between the secondary chamber 30 and a valve chamber 61.

A cylindrical tip portion 62 of a control valve 65 is adapted to fit in the opening 60. The control valve 65 has a body 66 which is threadedly received in an opening 67 of the body 18. The body 66 is cylindrical in cross section and has an opening 68 extending therethrough, this opening being closed at the lower end by a plate 69. The upper end of the body 66 is formed as indicated at 69 to receive a tool which is formed to fit therein, this tool being adapted to vary the axial position of the body 66 relative to the opening 60.

The lower end of the tip portion 62 of the control valve 65 has a pair of notches 75. These notches are diametrically aligned and are preferably a V shape having an apex 76. The relative position of the valve body 66 and the body 18 determines the axial position of the tip portion 62 relative to the opening 60. When the valve body 66 is screwed inward into a position shown in full lines in Fig. 2, the apex 76 of each notch 75 is below the upper surface of the inclined wall 28, so that no fluid may escape from the secondary chamber into the valve chamber 61. When the valve body 66 is turned so as to withdraw it slightly, the notch 75 will assume a position indicated in Fig. 4. At this time fluid under pressure in the secondary chamber 30 may escape into the valve chamber 61 through a triangular opening 79 defined between each apex 76 and the upper surface of the inclined wall 28. Substantially no fluid will escape through the inclined wall 28 around the periphery of the tip portion 62 inasmuch as the tip portion forms a sliding fit with the opening 60. If the valve body 66 is unscrewed into a position indicated by the dotted lines 80 of Fig. 2, the openings 79 become larger inasmuch as the walls of the notches 75 diverge and the apex 76 is drawn upward. In the dotted line position 80 the tip portion 62 is entirely removed from the opening 60, so that a maximum amount of water flows from the secondary chamber 30 into the valve chamber 61.

The control valve 65 of my invention is particularly useful in regulating the flow of fluids when these fluids contain small particles of foreign matter. I have found that if an ordinary disc valve is used, and the flow therethrough is decreased to small proportions, these foreign particles tend to clog between such a disc valve and its seat, inasmuch as a very narrow slit is at this time provided between the seat and the disc valve. Any gravel or other foreign matter which might pass through the interstices 53 tends to clog such a small slit. In the form of the valve shown in the drawings the openings 79 through which the fluid passes are triangular in shape. Thus the openings 79 would not become clogged unless a particle of considerable diameter be caught therein and such a sized particle could not possibly pass through the interstices 53. Using a disc valve for the same amount of flow would require that all particles passing therethrough would have to be much smaller in diameter than the width of the narrow slit. For this reason the type of valve shown in the drawings is far superior to the well known disc valve type.

Another advantage of my valve over the ordinary disc valve is that when the valve is nearly closed, the streams through the openings 79 will be uniform. I have found by actual experience that an ordinary disc valve tends to readjust itself when closed sufficiently so as to pass only a small stream of fluid, thus precluding a steady and uniform flow therethrough.

In opening my invention, the streams of water flowing from the nozzles 13 are equally adjusted by means of the control valves 65. When once adjusted, the sprinkler system may be used steadily or intermittently as desired. When in use, any foreign matter larger than the interstices 53 will accumulate in the strainer unit 48. After some use it is desirable to remove the strainer unit 48 and clean the sediment or foreign matter from the accumulation chamber 55. Before removing the strainer 47 the shut off valve 37 is screwed inwardly into its dotted line position, in which position it allows no passage of fluid from the primary chamber 26 into the secondary chamber 30. The strainer 47 is then removed by unscrewing the cap 50 and sliding the strainer out along the axis A—A. After cleaning the strainer 47, it is reinserted and clamped in place by the cap 50. At this time the shut off valve 37 is again unscrewed into its full line position, and fluid again passes into the interior of the strainer 47 and to the secondary chamber through the interstices 53. It should be clear that the adjustment of the control valve 65 is not changed in thus closing the shut off valve 37. Thus the balance of the irrigation system is not disturbed.

I claim as my invention:

1. In a control and strainer valve for an irrigation system, the combination of: a body having a fluid inlet in the lower part thereof, a fluid outlet in the upper part thereof, an interior wall dividing said body into a primary chamber on one side and a secondary chamber on the other side thereof, said fluid inlet being connected to said primary chamber, and said fluid outlet being connected to said secondary chamber, an opening in said interior wall joining said primary chamber and said secondary chamber, and an external port connecting said secondary chamber with the exterior of said body, a ring within said opening having an internal double seat; a strainer unit disposed in said secondary chamber, said strainer unit including a hollow strainer open at one end, and a strainer cap which closes the other end of said hollow strainer and is screwed into said external port, said hollow strainer being inclined with its closed end lower than its open end and having its open end seated on one side of said seat, said strainer unit being removable through said external port without being moved from inclined position, and a shut-off valve in said primary chamber adapted to seat on the other side of said seat.

2. In a control and strainer valve for an irrigation system, the combination of: a body having a fluid inlet in the lower part thereof, a fluid outlet in the upper part thereof, an interior wall dividing said body into a primary chamber on one side and a secondary chamber on the other side thereof, said fluid inlet being connected to said primary chamber, and said fluid outlet being connected to said secondary chamber, an opening in said interior wall joining said primary chamber and said secondary chamber, an upper wall providing a tertiary chamber between said secondary chamber and said fluid outlet by means of which said secondary chamber is connected to said fluid outlet, a passage in said upper wall, and an external port connecting said secondary chamber with the exterior of said body, a strainer unit disposed in said secondary chamber, said strainer unit including a hollow strainer open at one end, and a strainer cap which closes the other end of said hollow strainer and is screwed into said external port, said hollow strainer being inclined with its closed end lower than its open end and having its open end held against said walls separating said primary and secondary chambers so that the interior of said hollow strainer is in communication with said opening, said strainer unit being removable through said external port without being moved from inclined position, means in said primary chamber for closing said opening, and a control valve for controlling the rate of flow through said passage.

3. In a device of the class described, the combination of: a body, means dividing said body into a primary chamber and a secondary chamber, a fluid inlet communicating with said primary chamber and a fluid outlet communicating with said secondary chamber, an opening through said dividing means whereby fluid may flow through said chambers from said inlet to said outlet, a ring within said opening having an internal double seat, a tubular strainer unit in said secondary chamber having one end thereof seated on one side of said seat and the bottom wall thereof inclined downwardly toward the other end of said unit whereby residue will be retained by gravity in said unit, a shut-off valve in said primary chamber adapted to seat on the other side of said seat, and a control valve in said secondary chamber adjustable to vary the amount of fluid discharging from said secondary chamber through said outlet.

4. In a device of the class described, the combination of: a body, means dividing said body into a primary chamber and a secondary chamber, a fluid inlet communicating with said primary chamber and a fluid outlet communicating with said secondary chamber, an opening through said dividing means whereby fluid may flow through said chambers from said inlet to said outlet, a ring having an internal double seat in said opening, a tubular strainer unit adapted to seat on one side of said seat, and a shut-off valve adapted to seat on the other side of said seat.

5. In a device of the class described, the combination of: a body having a strainer chamber formed therein, a fluid inlet opening for said strainer chamber, a ring within said opening having an internal double seat, a tubular strainer unit within said chamber having an inlet mouth seated on one side of said seat, a shut-off valve adapted to seat on the opposite side of said seat, and a fluid outlet for said chamber.

6. In a device of the class described, the combination of: a body, a wall dividing said body into a primary chamber and a secondary chamber, a fluid inlet communicating with said primary chamber and a fluid outlet communicating with said secondary chamber, an opening in said wall, a second wall within said body forming a tertiary chamber between said secondary chamber and said outlet, a passage in said second wall, a tubular strainer unit in said secondary chamber having one end thereof positioned in said opening, a closure plug adapted to fit over said opening, and a control valve for controlling the rate of flow of fluid thru said passage.

7. In a device of the class described, the combination of: a body, a wall dividing said body into a primary chamber and a secondary chamber, a fluid inlet communicating with said primary chamber and a fluid outlet communicating with said secondary chamber, an opening in said wall, a second wall within said body forming a tertiary chamber between said secondary chamber and said outlet, a passage in said second wall, a double seat member in said opening, a tubular strainer unit in said secondary chamber having one end thereof seated on one side of said member, a shut-off valve in said primary chamber adapted to seat on the other side of said member, and a control valve for controlling the rate of flow of fluid thru said passage.

In testimony whereof, I have hereunto set my hand at Los Angeles, California, this 23rd day of November, 1927.

WALTER VAN E. THOMPSON.